Dec. 6, 1960

W. B. BANKS ET AL
APPARATUS FOR AUTOMATICALLY TESTING
AND METERING OIL FIELD PRODUCTION 2,962,894

Filed June 25, 1957

WILLIAM B. BANKS &
GARNET E. DUNCAN
INVENTORS·

BY

Attorney

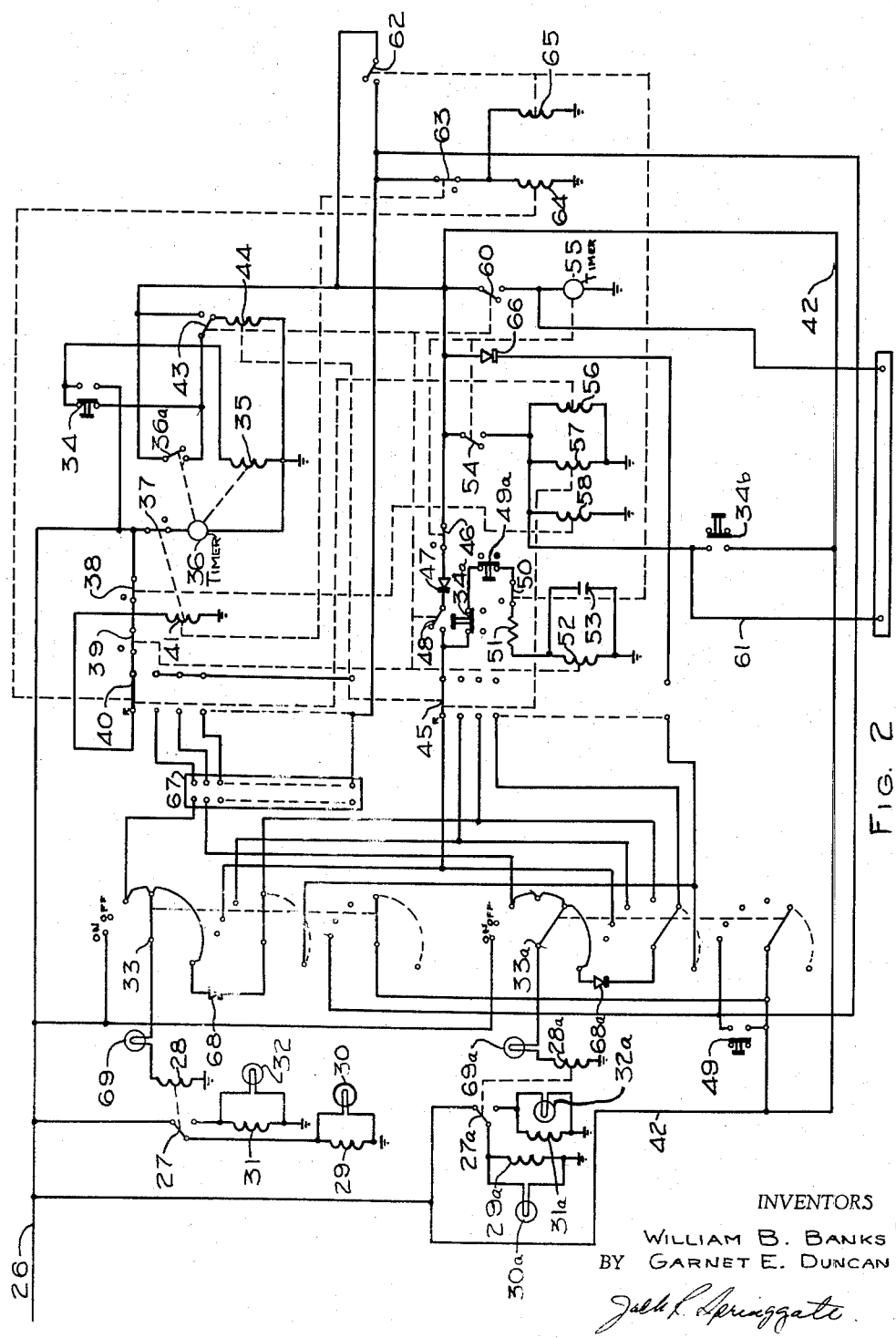

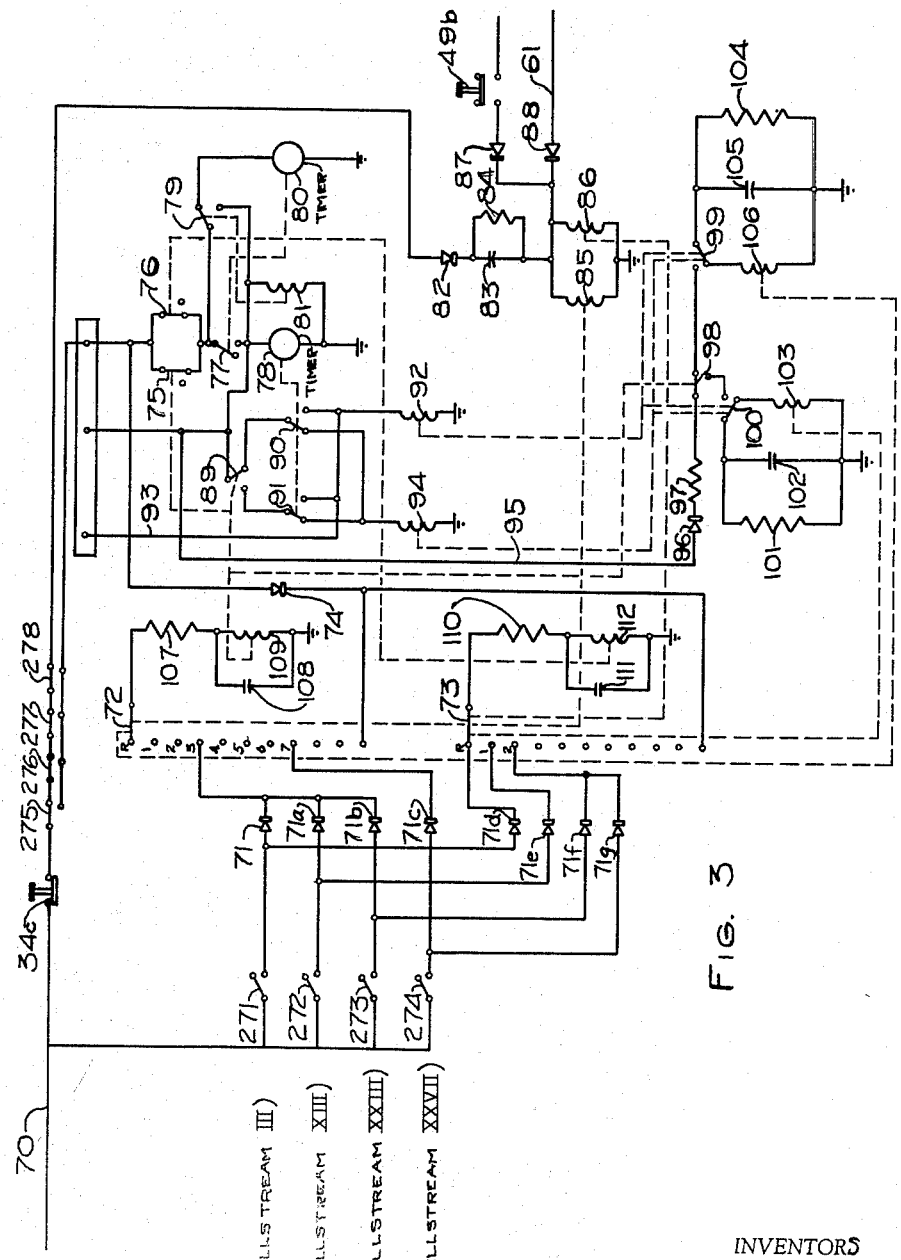

United States Patent Office 2,962,894
Patented Dec. 6, 1960

2,962,894

APPARATUS FOR AUTOMATICALLY TESTING AND METERING OIL FIELD PRODUCTION

William B. Banks and Garnet E. Duncan, Houston, Tex., assignors to Black, Sivalls & Bryson, Inc., Kansas City, Mo., a corporation of Delaware Filed June 25, 1957, Ser. No. 667,767

5 Claims. (Cl. 73—155)

The present invention relates generally to an apparatus for automatically controlling and testing the flow of oil and gas from a plurality of oil and gas wells. Specifically, the present invention relates to an electrical control system for the control, metering and testing of the flow from a plurality of oil and gas wells which will automatically select the flow from one well for testing for a predetermined period of time, will continue the production and metering of flow from the remainder of said wells and will proceed to test each well in a predetermined sequence for a predetermined length of time.

Prior to the present invention the testing of the flow from individual wells was accomplished by manually switching the well to a metering test vessel. The automatic control of production and testing including the metering of all oil is desirable and will result in a substantial saving to the producer of the wells. Therefore, the primary object of the present invention is to provide an apparatus for the control, metering and testing of production from a plurality of oil and gas wellstreams.

A further object of the present invention is to provide an apparatus for automatic electrical control, metering and testing of production from a plurality of oil and gas wellstreams. A still further object of the present invention is to provide an apparatus for automatically controlling the testing of individual wellstreams of a plurality of wellstreams during predetermined time intervals without interruption of the production and metering of the remainder of such wellstreams. Another object of the present invention is to provide a control system for production, metering and testing a plurality of oil and gas wellstreams having an adjustable time interval for the period of testing with a single timing mechanism.

In accomplishing these and other objects of the present invention, we have provided apparatus illustrated in the accompanying drawings wherein:

Fig. 2 is a schematic diagram of the control system of the present invention.

Fig. 3 is a schematic diagram of an electrical identification system which may be used in conjunction with the control system illustrated in Fig. 2.

Figure 1:
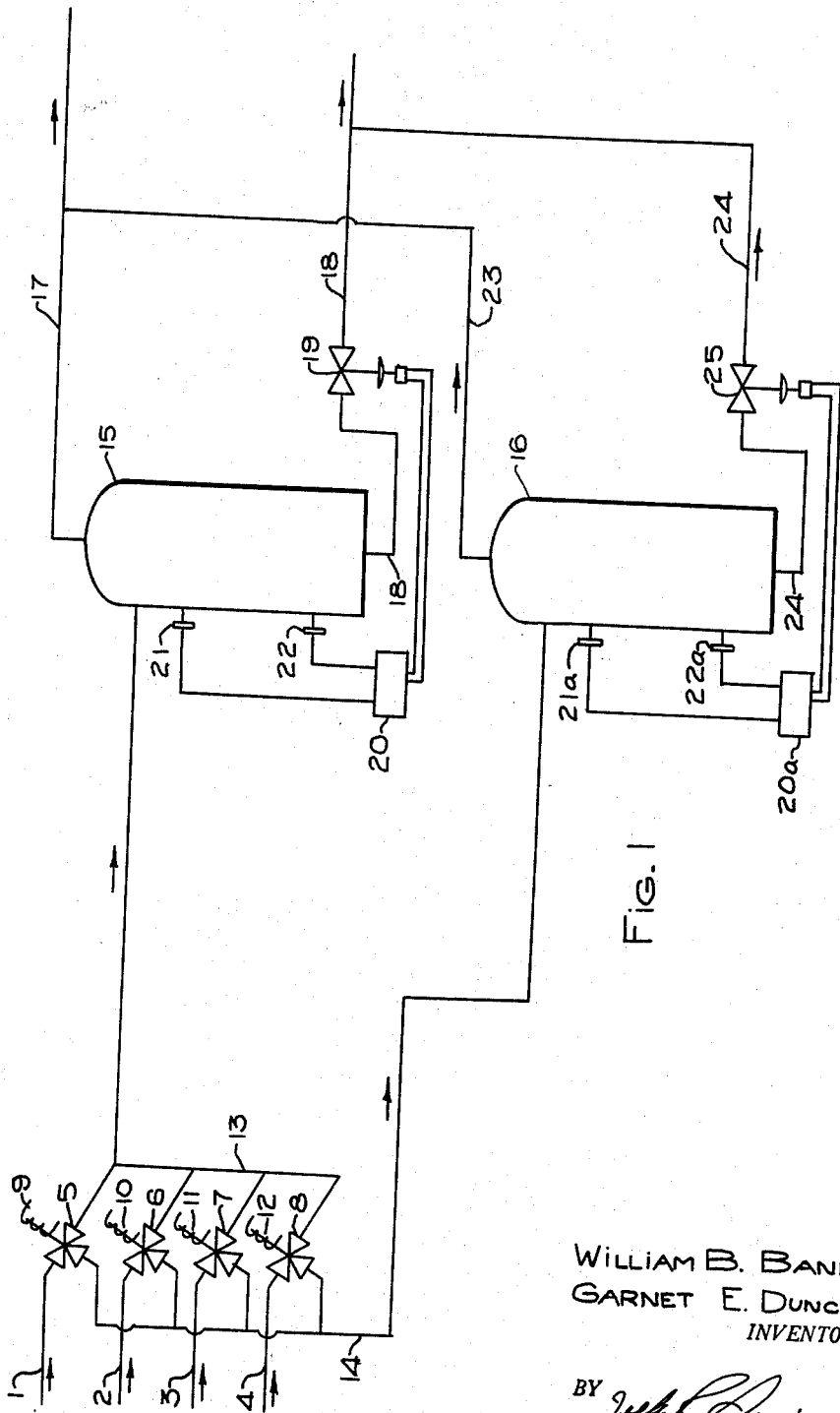
Fig. 1 is a schematic drawing of production and testing equipment as used with the control system of the present invention.

Referring more in detail to the drawings:

The numerals 1, 2, 3 and 4 indicate oil and gas wellstream flow lines which are connected to valves 5, 6, 7 and 8 respectively. Valves 5, 6, 7 and 8 are three-way valves and are electrically operated as indicated schematically by coils 9, 10, 11 and 12. The electrical operation of valves 5, 6, 7 and 8 is more fully explained in the discussion of the control system of Fig. 2. Valves 5, 6, 7 and 8 connect wellstream flow lines 1, 2, 3 and 4 to test manifold 13 and production manifold 14 and are controlled so that each wellstream may be connected to either test manifold 13 or production manifold 14. Test manifold 13 is connected to test metering separator 15 and production manifold 14 is connected to production metering separator 16. Gas is discharged from separator 15 through gas outlet duct 17 which is connected to a pipeline or other suitable gas transmission system. Separated oil is discharged from separator 15 through oil outlet duct 18 and valve 19 in metered quantities and is delivered to suitable storage. Valve 19 is shown to be controlled by controller 20 in response to liquid level sensing devices 21 and 22. Gas is discharged from separator 16 through gas outlet duct 23 which connects into gas outlet duct 17. Separated oil is discharged from separator 16 through oil outlet duct 24 and valve 25 in metered quantities and is connected into duct 18 for delivery to storage. Valve 25 is shown to be controlled by controller 20a in response to liquid level sensing device 21a and 22a.

It has been found to be desirable that valves 5, 6, 7 and 8 be three-way, three-position type valves so that the wellstream flow may be shut off or delivered to either test manifold 13 or production manifold 14. Valves 5, 6, 7 and 8 are only representative of a small group controlling four wellstreams. The present invention is applicable and may be used to control many more wellstreams with only minor modification of the control system of the present invention as hereinafter described.

Referring to the electrical control system of the present invention as illustrated in Fig. 2, potential is supplied to the system through line 26. Line 26 is connected to relay switches 27 and 27a which are controlled by relay coils 28 and 28a respectively. When switch 27 is in the position illustrated in Fig. 2, line 26 is connected therethrough to solenoid 29 which controls a valve (not shown), such as valve 5 in Fig. 1, to direct the wellstream flow to production equipment. Signal light 30 is also connected in parallel with solenoid 29 to indicate that the wellstream is flowing to production. When switch 27 is connected to its other terminal, line 26 is connected to solenoid 31 which controls a valve (not shown), such as valve 5 in Fig. 1, to direct the wellstream flow to the test equipment. Signal light 32 is connected in parallel with solenoid 31 to indicate that the wellstream is flowing to test. For each wellstream which is to be individually processed a separate set of controls including a three-section rotary switch 33 or 33a a relay switch 27 or 27a, a relay coil 28 or 28a, a solenoid 29 or 29a, a signal light 30 or 30a, a solenoid 31 or 31a and a signal light 32 or 32a will be provided and connected to line 26 as shown to control the wellstream flow to test or production for the desired period of time.

Potential is supplied through lines 26 to one of the unconnected terminals of test advance switch 34. The other of the unconnected terminals is connected through clutch coil 35 of timer 36 to a ground connection. Line 26 is also connected through normally closed switches 38 and 39 to stepping relay 40. With stepping relay 40 positioned on reset as shown in Fig. 2, potential is supplied through relay coil 41 to a ground connection. With potential supplied to relay coil 41 switch 37 will be held in open position preventing the operation of timer 36. Timer 36 is connected to close normally open switch 36a at the end of its timing cycle. Potential is supplied from line 26 through line 42 to one terminal of switch 36a and to the open terminal of switch 43. The second terminal of switch 36a is connected through the normally closed terminals of switch 34, clutch coil 35 to a ground connection and also to the central terminal of switch 43 which when positioned as shown in Fig. 2, is connected by its closed terminal through step coil 44 of stepping relay 45 to a ground connection.

Line 42 also supplies potential through normally closed switch 46 and rectifier 47 to one terminal of normally open switch 48. The other terminal of switch 48 is connected to stepping relay 45 and also through the normally closed terminals of test advance switch 34a, normally closed terminals of test zero switch 49a, normally closed switch 50, resistance 51 and relay coil 52 to a ground connection. Capacitor 53 is connected into the foregoing circuit in parallel with relay coil 52.

Line 42 supplies potential to one terminal of normally open switch 54 which is controlled by timer 55. The other terminal of switch 54 is connected in parallel through step coil 56 of stepping relay 40 through reset coil 57 of stepping relay 45 and through relay coil 58 which controls normally closed switch 38 to a ground connection. Step coil 56, reset coil 57 and relay coil 58 are all connected to line 42 through test advance switch 34b when the normally open terminals of test advance switch 34b are closed.

Potential is supplied by line 42 to the central terminal of normally open relay switch 60 which is controlled by relay coil 52. When relay switch 60 is closed, potential is supplied through timer 55 to a ground connection and to an accelerated chart drive of a recording chart (not shown) which is used to record the wellstream testing. Also, line 61 is connected to the test identifier illustrated in Fig. 3.

Line 42 is further connected as shown to supply potential through normally open relay switch 62 to the last contact of stepping relay 40 and also through normally closed switch 63 through reset coil 64 of stepping relay 40 to a ground connection. Relay coil 65 which controls relay switch 62 is connected in parallel with reset coil 64 and is also connected to a ground connection. Line 42 is further connected through rectifier 66 to the last contact of stepping relay 45.

Line 26 is further connected to the "on" terminal of each first section of rotary switches 33 and 33a. The "off" terminal of each first section of switches 33 and 33a is not connected into any circuit. The other terminals of each first section of switches 33 and 33a are connected to each other, to a junction in panel 67 and through rectifiers 68 and 68a respectively to the central terminal of the second section of switches 33 and 33a. The central terminals of the first sections of switches 33 and 33a are connected through signal lights 69 and 69a to relay coils 28 and 28a respectively.

Panel 67 preferably should be provided with a set of plugs and junctions (not shown) so that the connected terminals of the first section of each of switches 33 can be connected to any terminal of stepping relay 40 since, as hereinafter explained, stepping relay 40 will determine the order in which the wellstreams are tested.

Considering the second sections of switches 33 and 33a, the first terminals (the terminal positioned similar to the "on" terminal of the first section) are free of any connection. The second terminals (the terminal positioned similar to the "off" terminal of the first section) are connected to the reset position of stepping relay 45. The other terminals of the second sections are connected in order to the other terminals of stepping relay 45 with the last terminals of the second section of each rotary switch 33 and 33a being connected to the last terminal of stepping relay 45.

Line 42 is connected to each of the central terminals of the third sections of switches 33 and 33a. Also, one of the normally open terminals of test zero switch 49 is connected to the first terminal of each third section of switches 33 and 33a and to the last terminal of stepping relay 40 and the other of the normally open terminals of test zero switch 49 is connected to the central terminals of each third section of rotary switches 33 and 33a.

Rotary switches 33 and 33a should be mounted on a control panel together with signal lights 30, 30a 32, 32a, 69 and 69a, panel 67, test zero switch 49 and 49a and test advance switch 34, 34a and 34b.

Referring to the schematic system of Fig. 3, the components illustrated therein and in Fig. 2 will be shown to have the same identifying numerals. Identification of wellstreams may be by actual well number or by a series of numbers assigned in numerical order to the wells being processed. For purposes of clarity in the present application four well numbers are assumed (III, XIII, XXIII and XXVII as indicated in Fig. 3) to clearly illustrate the functioning of the test identifier of the present invention.

Line 70 provides a supply of alternating potential to normally open switches 271, 272, 273 and 274 which are controlled by relay coils 28 and 28a and two other relay coils not shown in Fig. 2. Switches 271, 272, 273 and 274 are connected through rectifiers 71, 71a, 71b, 71c, 71d, 71e, 71f and 71g to the proper terminals on stepping relay 72 and stepping relay 73. As illustrated in Fig. 3 the circuits representing wellstreams III, XIII and XXIII are all connected to terminal 3 of stepping relay 72 and the circuit representing wellstream XXVII is connected to terminal 7 of stepping relay 72. Further, the circuit of wellstream III is connected to the reset "R" terminal or first terminal of stepping relay 73, the circuit of wellstream XIII is connected to terminal 1 of stepping relay 73 and the circuits of wellstreams XXIII and XXVII are connected to terminal 2 of stepping relay 73.

Line 70 also supplies potential through normally closed terminals of test advance switch 34c to normally closed terminals of switches 275, 276, 277 and 278. When one of switches 275, 276, 277 or 278 is moved to its other position, a circuit is completed through rectifier 74 to the last terminals of stepping relays 72 and 73. Normally closed switches 75 and 76 are connected in parallel as shown with potential being supplied from line 70 through test advance switch 34c and one of switches 275, 276, 277 or 278. Time delay switch 77 (normally open) is connected in series to switches 75 and 76 and connects through cam timer 78 to a ground connection. Relay switch 79 has its normally open terminals connected in parallel with time delay switch 77 and connects through its normally closed terminals through timer 80 to a ground connection. Timer 80 should be designed to provide a time period of at least twenty seconds for reasons as hereinafter more fully explained. Timer 80 is connected to time delay switch 77 to close time delay switch 77 at the end of the timing period. Relay coil 81 is connected into the foregoing circuit in parallel with cam timer 78 and changes the position of relay switch 79 when energized.

Switches 275, 276, 277 and 278 are connected through rectifier 82, capacitor 83 and resistance 84 connected in parallel with respect to each other and through reset coil 85 and reset coil 86 to a ground connection. As shown in Fig. 3, reset coils 85 and 86 are connected in parallel with respect to each other. Reset coil 85 is connected to reset stepping relay 72 and reset coil 86 is connected to reset stepping relay 73. Potential may be supplied to reset coils 85 and 86 through test zero switch 49b and rectifier 87 or through line 61 and rectifier 88.

Relay switch 89 is connected into the circuit between time delay switch 77 and cam timer 78. One terminal of relay switch 89 connects to switch 90 and the other terminal connects to switch 91. Both switch 90 and switch 91 are controlled by cam timer 78. One terminal each of switches 90 and 91 is connected to reset coil 92 and also to line 93 which is connected to an electrically operated marker on a recording chart or some other suitable device for recording wellstream identification. The other terminals of switches 90 and 91 are connected to latching coil 94. Coils 92 and 94 are properly grounded.

Line 95 also connects into the circuit between time delay switch 77 and cam timer 78 and leads to a signal light (not shown) to indicate when identification of the wellstream on test is in progress. Line 95 also connects through rectifier 96, resistance 97, the normally closed terminals of switch 98 to latching relay switch 99. The open terminal of switch 98 is connected to the open terminal of latching relay switch 100. The central terminal of switch 100 connects to resistance 101 and capacitor 102. The normally closed terminal of switch 100 connects to step coil 103. Resistance 101, capacitor 102 and step coil 103 are all connected in parallel to a ground connection. Step coil 103 is connected to step stepping relay 73 when energized. The central terminal of latching relay switch 99 connects to resistance 104 and capacitor 105 and the normally closed terminal of switch 99 connects to step coil 106. Step coil 106 is connected to step stepping relay 72 when energized. Resistance 104, capacitor 105 and step coil 106 are all connected in parallel to a ground connection. Latching relay switches 99 and 100 are both controlled by reset coil 92 and latching coil 94.

The wiper arm of stepping relay 72 is connected through resistance 107 to capacitor 108 and relay coil 109. Capacitor 108 and relay coil 109 are connected in parallel to a ground connection. Relay coil 109 is connected to actuate switches 75, 89 and 98. The wiper arm of stepping relay 73 is connected through resistance 110 to capacitor 111 and relay coil 112. Capacitor 111 and relay coil 112 are connected in parallel to a ground connection. Relay coil 112 is connected to actuate switch 76.

Assuming that the wellstream flowing through flow line 1 (wellstream III in Fig. 3) is to be tested and the other wellstreams are to be produced through production equipment, switch 33 in Fig. 2 which serves wellstream III should be set to the desired time interval for the testing period. If any of the other wellstreams are to be subsequently tested, then their individual switches 33a, etc. should be set in a similar manner to preset their testing period. Panel 67 should be hooked up to determine the order in which the wellstreams are to be tested. The test period is dependent upon the time interval of timer 36. Assuming switch 33 is provided with fourteen terminals and that timer 36 establishes a two-hour interval and that switches 33 and 33a for wellstreams III and XIII are set as shown in Fig. 2, then wellstream III will be directed to test initially and wellstream XIII will be directed to production. After a period of four hours, timer 36 will have completed two cycles and wellstream III will be switched to production and wellstream XIII will be switched to test for a six-hour period as hereinafter more fully described. The other switches similar to switches 33 and 33a for the other wellstreams being processed should be set for the period of time during which they are to be tested and panel 67 should be connected to provide the proper sequence of testing the individual wellstreams.

With the settings of switches 33 and 33a for wellstreams III and XIII as shown in Fig. 2 all wellstreams will be directed to production as soon as potential is supplied to the control system of Fig. 2. To start the testing of wellstream III, test advance switches 34, 34a, 34b, and 34c should be pushed to close the circuit to step coil 56 which will cause stepping relay 40 to advance one terminal, to reset coil 57 which will cause stepping relay 45 to be positioned in reset position and to relay coil 58 which will open switch 38. Stepping relay 40 is used to locate the wellstream to be tested and when it is stepped into its first position, it will be connected through panel 67 to the first section of switch 33 which controls wellstream III. Also, while stepping relay 40 is being stepped, switch 38 is opened by relay coil 58 thus preventing the energizing of relay coil 41 allowing switch 37 to close. Switch 37 will remain closed since the stepping relay 40 from its reset position breaks the circuit to relay coil 41. Relay coil 41 controls switch 63 which will remain closed until relay coil 41 is energized. Switch 63, when open, will prevent the resetting of stepping relay 40.

Test advance switches 34, 34a, 34b and 34c, when pushed, will complete a circuit to clutch coil 35 thereby engaging timer 36. When test advance switches 34, 34a, 34b and 34c are released, they return to their positions shown in Fig. 2. With the control system in the foregoing condition, potential is supplied to timer 36 commencing the first timing period and potential is supplied through stepping relay 40, panel 67, the first section of switch 33 and signal light 69 to energize relay coil 28. Switch 27 is actuated by relay coil 28 and, when actuated, completes a circuit energizing solenoid 31 and lighting signal light 32. Solenoid 31 will cause the control valve to be actuated to direct the flow of wellstream III to test. Since stepping relay 40 is connected to test wellstream III, no other wellstream will be on test.

At the end of its time interval, timer 36 will close switch 36a, completing a circuit from line 42 through switch 36a and switch 34 to energize clutch coil 35 of timer 36 and also through switch 43 to step coil 44, thereby advancing stepping relay 45. Since switch 37 is closed, timer 36 starts its timing interval again. At the end of the second time cycle, switch 36a again will be closed energizing step coil 44 and thereby stepping, stepping relay 45 to its next position. In this position a circuit will be completed extending from line 26 through switches 38 and 39, stepping relay 40, the first section of switch 33, rectifier 68, the second section of switch 33, stepping relay 45, test advance switch 34a, test zero switch 49a, switch 50 and resistance 51 to energize relay coil 52. Capacitor 53 is used to smooth the flow of current energizing relay coil 52. The energizing of relay coil 52 will open switch 39, close switch 48 and complete a circuit from line 42 through switch 46, rectifier 47, switch 48, test advance switch 34a, test zero switch 49a, switch 50, resistance 51 to keep relay coil 52 energized. The opening of switch 39 will break the original circuit energizing relay coil 52. Also, relay coil 52 will throw switches 43 and 60 to positions opposite to their position shown in Fig. 2. The change of switch 60 will energize timer 55 and also will connect to a recording chart drive mechanism (not shown) to speed up the chart for a brief interval in order to be able to identify a change in the wellstream being tested.

Timer 55 is recommended to have a short timing interval, for example, approximately one minute. At the end of its timing period timer 55 will open switch 46 breaking the circuit to coil 52 and will close switch 54 energizing step coil 56, reset coil 57 and relay coil 58 sending a pulse through line 61 to start the test identifier illustrated in Fig. 3 as hereinafter more fully described. Step coil 56 will cause stepping relay 40 to advance to its next terminal thereby breaking connection to relay coil 28 and allowing switch 27 to return to its position as shown in Fig. 2. Thus, wellstream III will be switched to production and wellstream XIII will be switched to test. At the same time reset coil 57 will cause stepping relay 45 to be returned to its reset position. The energizing of relay coil 58 will cause switch 38 to be opened. The opening of switch 38 breaks the circuit to stepping relay 40 while it is being advanced. The opening of switch 46 will break the circuit energizing relay coil 52 allowing switches 39, 43, 48 and 60 to return to their position as illustrated in Fig. 2. The moving of switch 60 will cause switch 54 to be opened and switch 46 to be closed. With the circuit to relay coil 58 broken, switch 38 will close completing a circuit from line 26 through switches 38 and 39, stepping relay 40, the first section of switch 33a for wellstream XIII, signal light 69 to energize relay coil 28 thereby directing wellstream XIII to test. With switch 33 for wellstream XIII set as shown in Fig. 2 and with the aforementioned assumption of a two-hour timing period of timer 36, wellstream XIII will remain on test for a period of six hours and then will be switched to production. This operation will be similar to that previously described in relation to the testing of wellstream III. Also, testing of other wellstreams will proceed until stepping relay 40 reaches its last terminal. When stepping relay 40 reaches its last terminal, a circuit is completed from line 26 through switches 38, 39 and 63 to energize relay coil 65 and reset coil 64. Relay coil 65 will open switch 50 and will close switch 62 completing a circuit from line 42 through switches 62 and 63 to relay coil 65 and reset coil 64. This second circuit is necessary to assure proper resetting of stepping relay 40 since the first circuit will be broken as soon as the wiper arm of stepping relay 40 moves. When stepping relay 40 has been returned to its reset position, a circuit is completed through switches 38 and 39 and through stepping relay 40 to energize relay coil 41. Relay coil 41 will cause switch 63 to open, breaking the circuit to reset coil 64 and relay coil 65 and causing switch 62 to open, switch 50 to close, and switch 37 to open. To restart the testing cycle, test advance switches 34, 34a, 34b and 34c have to be manually actuated.

Another feature of the present invention is that when stepping relay 45 advances to its last position without completing a circuit through one of the switches 33, another circuit from line 42 through rectifier 66, stepping relay 45, switches 34a, 49a and 50 and resistance 51 to relay coil 52 is completed. This will close switch 60, starting timer 55 which will close switch 54 causing stepping relay 40 to be advanced and stepping relay 45 to be reset.

Thus, the control system of the present invention will accommodate as many wellstreams as there are positions on stepping relay 40. Also, the duration of wellstream testing is limited only by the timing interval of timer 36 and the number of positions on stepping relay 45 and the second section of switch 33.

If it is desired to maintain a particular wellstream, for example, wellstream 3, on test over a long period of time, its switch 33 should be positioned to the "on" position and a circuit will be completed directly from line 26 through switch 33 and signal light 69 to energize relay coil 28 causing switch 27 to move to energize solenoid 31.

Also, a wellstream switch 33 may be set on its "off" position and thereby flowing the wellstream to production without testing. Test advance switches 34, 34a, 34b and 34c may be pushed at any time and will result in terminating the testing of one wellstream and placing the next wellstream on test since it will energize step coil 56 and reset coil 57 thereby advancing stepping relay 40 to the next connected wellstream. If one of the wellstreams has its switch 33 in the "off" position, then when stepping relay 40 contacts that position, no circuit is formed to relay coil 28. The second section of switch 33 would be in contact with the reset position of stepping relay 45 causing relay 52 to be energized and thereby advancing stepping relay 40 to the next subsequent wellstream to be tested. These features lend an availability of manual control if desired.

Another feature of the present invention is the function of test zero switches 49, 49a and 49b. Manual actuation of test zero switches 49, 49a and 49b will result in the resetting of stepping relay 40 as hereinafter described so that the sequence of testing may be restarted as originally described by using test advance switches 34, 34a, 34b and 34c. This is accomplished by completing a circuit through test zero switch 49 and switch 63 to energize reset coil 64. At the same time relay coil 65 is energized, switch 62 is closed thereby completing a circuit from line 42 through switches 62 and 63 to reset coil 64. Thus, reset coil 64 is energized until stepping relay 40 is returned to its reset position. In its reset position a circuit is completed from line 26 through switches 38 and 39, stepping relay 40 to relay coil 41. The energizing of relay coil 41 will open switch 63 thereby breaking the circuit to step coil 64 and relay coil 65 allowing switch 62 to open. With stepping relay 40 in reset position it is necessary to push test advance switches 34, 34a, 34b and 34c to again start the operation of the control system of Fig. 2.

As previously mentioned, when test advance switches 34, 34a, 34b and 34c are pushed to start the system of Fig. 2 into operation or when the system switches to test a wellstream, a pulse of current is sent through line 61 to reset coils 85 and 86 in Fig. 3 which return stepping relays 72 and 73 to their reset positions. Potential will be supplied to the test identifier from line 70 through test advance switch 34c and the one of switches 275, 276, 277 and 278 which is closed through parallel switches 75 and 76, switch 79 to start timer 80. Timer 80 should preferably have a time period of approximately twenty seconds or longer so that an identification is not started until the wellstream to be tested can be located by stepping relay 40. At the end of the time period timer 80 will close switch 77 to start cam timer 78 and to energize relay coil 81. Relay coil 81 actuates switch 79 to close the circuit around switch 77 from switches 75 and 76 to cam timer 78 and relay coil 81. Cam timer 78 controls switches 90 and 91. With relay switch 89 positioned as shown in Fig. 3, latching coil 94 is energized holding latching relay switch 99 in the position as shown in Fig. 3. As cam timer 78 rotates, switches 90 and 91 will be moved back and forth between their respective terminals. As switch 90 is moved to its second terminal a short pulse is sent through line 93 and to reset coil 92 to reset switch 99 and to build up a charge on capacitor 105. As switch 90 moves to its first terminal, latching coil 94 is energized causing switch 99 to close a circuit from capacitor 105 to energize stepping coil 106, thereby advancing stepping relay 72.

With the assumed wellstream numbers and the connections as shown in Fig. 3, and wellstream III on test, three short pulses will be sent through line 93 to the test identifier. At the end of the third pulse, capacitor 105 will be charged and as switch 90 energizes latching coil 94, stepping relay 72 will be stepped to its third terminal from its reset position. In this position a circuit is completed from line 70 through switch 271 for wellstream III, rectifier 71, stepping relay 72 and resistance 107 to energize relay coil 109. Capacitor 108 is used to smooth out the half wave current output of rectifier 71 to assure proper operation of relay coil 109. The energizing of relay coil 109 will open switch 75 and move switches 89 and 98 to their opposite positions from their positions as shown in Fig. 3.

As switch 91 is moved to its other position, a long pulse normally would be sent through line 93 to the identifier but since wellstream 3 is being processed and is connected to the reset position of stepping relay 73, a circuit is completed from line 70 through switch 27 for wellstream III, rectifier 71d, stepping relay 73 and resistance 110 to energize relay 112. Capacitor 111 is used to smooth out the half wave current output of rectifier 71 to assure proper operation of relay coil 112. The energizing of relay coil 112 will cause switch 76 to be opened, thus stopping the operation of the test identifier circuit of Fig. 3 by shutting off the power which operates cam timer 78.

Assuming that wellstream XXIII were switched to test, its identification would proceed exactly as the identification of wellstream III except that after the three short identifying pulses, a long pulse would be sent through line 93 when switch 91 was originally moved. At the same time reset coil 92 would be energized thereby moving latching switch 100 to its reset position. This completes a circuit from line 95 through rectifier 96, resistance 97, switch 98 and latching relay switch 100 to charge capacitor 102. When switch 91 is returned to its position as shown in Fig. 3, latching coil 94 will be energized causing latching relay switch 100 to move to its latched position whereby capacitor 102 discharges through relay coil 103. The energizing of relay coil 103 will cause stepping relay 73 to advance. This operation will be repeated until stepping relay 73 is advanced a second time and then it will complete a circuit causing relay coil 112 to be energized thereby opening switch 76 and stopping the operation of the identifier system of Fig. 3.

When the wellstream being tested is switched to production, a circuit will be completed from line 70 through each of the switches 275, 276, 277 and 278, rectifier 82, resistance 84, with capacitor 83 being used to smooth out the half wave output of rectifier 82, to energize reset coils 85 and 86. Reset coil 85 will cause stepping relay 72 to be reset and reset coil 86 will cause stepping relay 73 to be reset. With the circuit in this position the system will be ready to proceed with the identification of the next wellstream to be tested.

The test identifier of Fig. 3 will provide long and short electric impulses which are capable of being translated into units and tens on a recording chart to identify a wellstream being tested. The limiting factors as to how high the test identifying system can count are the number of terminals on stepping relay 73 and the time available for identifying as compared with the speed of the cam timer 78. Cam timer 78 preferably operates to move switches 90 and 91 and to emit a short electric pulse through line 93 when switch 90 is in operation and to emit a longer electric pulse through line 93 when switch 91 is in operation.

Thus, it may be seen that we have provided a system for producing and testing a group of wellstreams and a system for identifying the wellstream being tested. The control system of the present invention may be operated automatically until all wellstreams have been tested or may be operated manually at any time. Further, we have provided a control system for producing and testing a plurality of wellstreams in which the duration and order of testing individual wellstreams may be varied by a simple presetting of the control system.

What we claim and desire to secure by Letters Patent is:

1. In combination with a plurality of wellstreams, a production manifold, a plurality of three-way valves connected between said wellstreams and said production manifold, each of said wellstreams being connected to a single one of said three-way valves, a test manifold, a plurality of bypass lines, each of said bypass lines connecting said test manifold to one of said three-way valves, a production metering separator, a test metering separator, said production manifold being connected into said production metering separator, said test manifold being connected into said test metering separator, a plurality of relays, each of said three-way valves being controlled by one of said relays, a first stepping relay connected to operate said relays separately, one at a time, in a predetermined order whereby one of said wellstreams may be directed through its three-way valve, its bypass line into said test metering separator and whereby the remaining wellstreams will be directed through their three-way valves, said production manifold into said production metering separator, a second stepping relay, a timing mechanism connected to said second stepping relay to step said second stepping relay at the end of each time interval of said timing mechanism, a connection provided from said second stepping relay to the stepping coil of said first stepping relay to cause said first stepping relay to be stepped when said second stepping relay has been stepped a preset number of times, said preset number of steps of said second stepping relay thereby determining the length of time during which the wellstream flows to said test metering separator, said stepping of said first stepping relay making a connection to energize a second of said relays controlling said three-way valves and breaking the connection to the first of said relays controlling said three-way valves, production recording means to record said production through said production metering separator, test recording means to record said production through said test metering separator, an identification system comprising, a third stepping relay, a fourth stepping relay, a cam mechanism adapted to emit long and short electric pulses representing units and tens of the wellstream number for the wellstream flowing to said test metering separator, said cam mechanism connected to advance said third and said fourth stepping relays, connections from a source of electrical power to the proper identifying terminals of said third and fourth stepping relays for each wellstream to be tested, switches in each of said connections, each of said switches connected to be actuated by the relay controlling the three-way valve of the wellstream which is to be identified by the connection, a first relay switch connected to said third stepping relay whereby a connection completed through said third stepping relay will cause said first relay switch to open, a second relay switch connected to said fourth stepping relay whereby a connection completed through said fourth stepping relay will cause said second relay switch to open, both said first and said second relay switches being connected in parallel with respect to each other in the circuit supplying electrical potential to said cam mechanism whereby the opening of both of said first and said second relay switches will cut off the electrical potential to said cam mechanism, and means connecting said long and short pulse outputs to said test recording means to provide numerical identification of the wellstream being tested.

2. Invention according to claim 1 including a time delay mechanism in the circuit supplying potential to said cam mechanism to postpone the identification of the wellstream being tested thereby allowing said first stepping relay to locate the wellstream to be tested.

3. Invention according to claim 2 including a chart drive for said test recording means, said chart drive having a normal recording speed and an accelerated test identifying speed, and means engaging said accelerated test identifying speed during periods of identification of the wellstream being tested.

4. In combination with a plurality of wellstreams, a production manifold, a plurality of three-way valves connected between said wellstreams and said production manifold, each of said wellstreams being connected to a single one of said three-way valves, a test manifold, a plurality of bypass lines, each of said bypass lines connecting said test manifold to one of said three-way valves, a production metering separator, a test metering separator, said production manifold being connected into said production metering separator, said test manifold being connected into said test metering separator, a plurality of relays, each of said three-way valves being controlled by one of said relays, a first stepping relay connected to operate said relays separately, one at a time, in a predetermined order whereby one of said wellstreams may be directed through its three-way valve, its bypass line into said test metering separator and whereby the remaining wellstreams will be directed through their three-way valves, said production manifold into said production metering separator, a second stepping relay, a reset coil for said second stepping relay, a timing mechanism connected to said second stepping relay to step said second stepping relay at the end of each time interval of said timing mechanism, a connection provided from said second stepping relay to the stepping coil of said first stepping relay to cause said first stepping relay to be stepped when said second stepping relay has been stepped a preset number of times, said preset number of steps of said second stepping relay thereby determining the length of time during which the wellstream flows to said test metering separator, said stepping of said first stepping relay making a connection to energize a second of said relays controlling said three-way valves and breaking the connection to the first of said relays controlling said three-way valves, production recording means to record said production through said production metering separator, test recording means to record said production through said test metering separator and a test advance switch connecting a source of potential to the reset coil for said second stepping relay and to the stepping coil for said first stepping relay.

5. In combination with a plurality of wellstreams, a production manifold, a plurality of three-way valves connected between said wellstreams and said production manifold, each of said wellstreams being connected to a single one of said three-way valves, a test manifold, a plurality of bypass lines, each of said bypass lines connecting said test manifold to one of said three-way valves, a production metering separator, a test metering separator, said production manifold being connected into said production metering separator, said test manifold being connected into said test metering separator, a plurality of relays, each of said three-way valves being controlled by one of said relays, a first stepping relay connected to operate said relays separately, one at a time, in a predetermined order whereby one of said wellstreams may be directed through its three-way valve, its bypass line into said test metering separator and whereby the remaining wellstreams will be directed through their three-way valves, said production manifold into said production metering separator, a reset coil for said first stepping relay, a second stepping relay, a reset coil for said second stepping relay, a timing mechanism connected to said second stepping relay to step said second stepping relay at the end of each time interval of said timing mechanism, a connection provided from said second stepping relay to the stepping coil of said first stepping relay to cause said first stepping relay to be stepped when said second stepping relay has been stepped a preset number of times, said preset number of steps of said second stepping relay thereby determining the length of time during which the wellstream flows to said test metering separator, said stepping of said first stepping relay making a connection to energize a second of said relays controlling said three-way valves and breaking the connection to the first of said relays controlling said three-way valves, production recording means to record said production through said production metering separator, test recording means to record said production through said test metering separator and a test zero switch connecting from a source of potential to the reset coils for said first and said second stepping relays.

References Cited in the file of this patent

UNITED STATES PATENTS

| | | |
|---|---|---|
| 2,290,626 | Bosomworth | July 21, 1942 |
| 2,541,519 | Jones | Feb. 13, 1951 |
| 2,697,348 | Bevins | Dec. 21, 1954 |
| 2,736,201 | Ohlsen et al. | Feb. 28, 1956 |
| 2,758,477 | Haeber | Aug. 14, 1956 |